US010817752B2

(12) United States Patent
Kehl et al.

(10) Patent No.: US 10,817,752 B2
(45) Date of Patent: Oct. 27, 2020

(54) VIRTUALLY BOOSTED TRAINING

(71) Applicant: TOYOTA RESEARCH INSTITUTE, INC., Los Altos, CA (US)

(72) Inventors: Wadim Kehl, San Francisco, CA (US); German Ros Sanchez, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 195 days.

(21) Appl. No.: 15/994,873

(22) Filed: May 31, 2018

(65) Prior Publication Data
US 2019/0370606 A1    Dec. 5, 2019

(51) Int. Cl.
G06K 9/62      (2006.01)
G06K 9/00      (2006.01)
G06N 20/00     (2019.01)

(52) U.S. Cl.
CPC ....... G06K 9/6259 (2013.01); G06K 9/00805 (2013.01); G06K 9/6262 (2013.01); G06N 20/00 (2019.01)

(58) Field of Classification Search
CPC .. G06N 20/00; G06K 9/00805; G06K 9/6259; G06K 9/6262
USPC ..................................................... 382/159
See application file for complete search history.

(56) References Cited

U.S. PATENT DOCUMENTS

| 8,411,092 B2 | 4/2013 | Sheblak et al. |
| 9,401,020 B1 | 7/2016 | Li et al. |
| 2010/0201871 A1 | 8/2010 | Zhang et al. |
| 2015/0175168 A1 | 6/2015 | Hoye et al. |
| 2016/0210382 A1 | 7/2016 | Alaniz et al. |
| 2016/0210383 A1 | 7/2016 | Alaniz et al. |
| 2016/0210775 A1 | 7/2016 | Alaniz et al. |
| 2018/0307936 A1* | 10/2018 | Kolouri .................. G06K 9/627 |
| 2019/0102646 A1* | 4/2019 | Redmon ............... G06K 9/4619 |
| 2019/0266418 A1* | 8/2019 | Xu ...................... G06K 9/00718 |

FOREIGN PATENT DOCUMENTS

WO    2017174982 A1    10/2017

OTHER PUBLICATIONS

Gaidon, et al., "Virtual Worlds as Proxy for Multi-Object Tracking Analysis", Computing Research Repository, Computer Vision and Pattern Recognition (cs.CV), May 20, 2016.
Zhang, et al., "Curriculum Domain Adaptation for Semantic Segmentation of Urban Scenes", Computing Research Repository, Computer Vision and Pattern Recognition (cs.CV), Aug. 5, 2017.
Mousavian, et al., "3D Bounding Box Estimation Using Deep Learning and Geometry", Computing Research Repository, Computer Vision and Pattern Recognition (cs.CV), Apr. 10, 2017.

* cited by examiner

*Primary Examiner* — Daniel G Mariam
(74) *Attorney, Agent, or Firm* — Seyfarth Shaw LLP

(57) ABSTRACT

A method for training a machine learning model includes receiving real data comprising a real element in a real environment. The training also includes annotating the real element with a first annotation based on predicted attributes of the real element. The first annotation having a first format. The training further includes converting the first format of the first annotation to a second format corresponding to a ground truth annotation of the real element. The training still further includes adjusting parameters of the machine learning model to minimize a difference between values of the ground truth annotation of the real element and the converted first annotation.

17 Claims, 9 Drawing Sheets

VIRTUALLY BOOSTED TRAINING

BACKGROUND

Field

Certain aspects of the present disclosure generally relate to machine learning and, more particularly, to improving systems and methods for object detection using an artificial neural network.

Background

A machine learning model (e.g., artificial neural network (ANN)) may be trained to detect objects in frames generated from information captured by one or more sensors, such as a light detection and ranging (LIDAR) sensor or a red-green-blue (RGB) camera. The sensors may be coupled to, or in communication with, a device, such as a robotic device, or a vehicle, such as an autonomous vehicle. The detected objects may be identified, localized, and/or tracked. Object detection may be used in various applications, such as route planning and collision avoidance.

For object detection, the machine learning model may be trained using simulated data, such as virtual images of virtual elements in a virtual environment. During training, the machine learning model localizes an object with a three-dimensional (3D) bounding box. A prediction error may be calculated from a loss between the predicted 3D bounding box and a ground truth 3D bounding box. The machine learning model may be updated based on the prediction error.

To improve training, it is desirable to train the artificial neural networks with both simulated data and real world data. The real world data may be annotated with two-dimensional (2D) bounding boxes provided by a human annotator. Still, because the artificial neural network predicts object locations with 3D bounding boxes, it is difficult to determine a prediction error for predictions based on real world images.

Aspects of the present disclosure are directed to improving the training of a machine learning model for object detection.

SUMMARY

In one aspect of the present disclosure, a method for training a machine learning model is disclosed. The method includes receiving real data comprising a real element in a real environment. The method also includes annotating the real element with a first annotation based on predicted attributes of the real element. The first annotation is in a first format. The method further includes converting the first annotation from the first format to a second format corresponding to a ground truth annotation of the real element. The method still further includes adjusting parameters of the machine learning model to minimize a difference between values of the ground truth annotation of the real element and the converted first annotation.

In another aspect of the present disclosure, a non-transitory computer-readable medium with non-transitory program code recorded thereon is disclosed. The program code is for training a machine learning model. The program code is executed by a processor and includes program code to receive real data comprising a real element in a real environment. The program code also includes program code to annotate the real element with a first annotation based on predicted attributes of the real element. The first annotation is in a first format. The program code further includes program code to convert the first annotation from the first format to a second format corresponding to a ground truth annotation of the real element. The program code still further includes program code to adjust parameters of the machine learning model to minimize a difference between values of the ground truth annotation of the real element and the converted first annotation.

Another aspect of the present disclosure is directed to an apparatus for training a machine learning model. The apparatus having a memory and one or more processors coupled to the memory. The processor(s) is configured to receive real data comprising a real element in a real environment. The processor(s) is also configured to annotate the real element with a first annotation based on predicted attributes of the real element. The first annotation is in a first format. The processor(s) is further configured to convert the first annotation from the first format to a second format corresponding to a ground truth annotation of the real element. The processor(s) still further configured to adjust parameters of the machine learning model to minimize a difference between values of the ground truth annotation of the real element and the converted first annotation.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
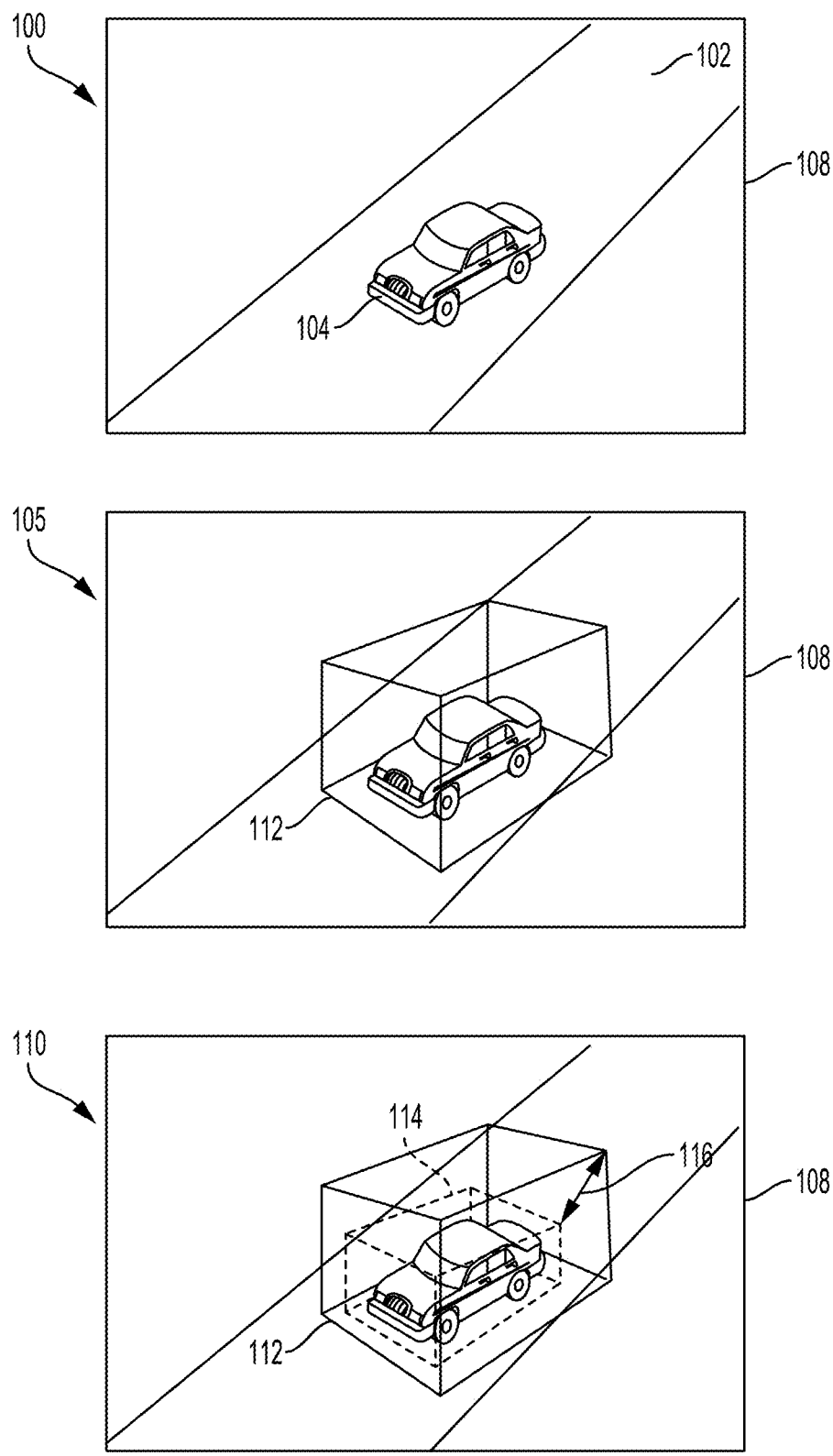
FIG. 1 illustrates an example of training a model using simulated data according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Real world objects, such as cars, trees, and people, have nine degrees of freedom, three degrees for position (e.g., x, y, z), three degrees for volume (e.g., width, length, and height), and three degrees in rotation (e.g., pitch, yaw, roll angles). Conventional object localization systems localize objects in a two-dimensional (2D) space. These conventional systems are limited to providing a 2D translation (e.g., height and width) and an object's scale.

To improve applications that use object localization, such as autonomous driving, robotics, and augmented reality, it is desirable to determine an object's volume, rotation, and relationship to other objects in a frame. The three-dimensional (3D) translation (e.g., location of the object within the frame), the 3D volume (e.g., width, length, and height) and 3D rotation (e.g., (x, y, z) coordinates) of the object may be referred to as a nine-dimensional (9D) pose of an object.

Predicting the 9D pose of an object improves real world interactions with the object. For example, accurate predictions of an object's 9D pose improves route planning and collision avoidance applications. Predicting the 9D pose of an object may be referred to as 9D object localization. Aspects of the present disclosure are not limited to predicting the 9D pose of an object. The object localization system may determine additional attributes of the object.

For object localization, such as 9D object pose localization, a machine learning model may be trained to localize an object in a frame generated from information provided by one or more sensors coupled to, or in communication with, a device, such as an autonomous vehicle. At training time, the machine learning model is provided with a set of training data $T=\{T_1, T_2, T_3, \ldots, T_n\}$. Each training instance $T_i$ may be simulated data or real world data. The simulated data may include photo-realistic images of objects (e.g., virtual images of objects). The real world data include real world images, such as RGB images, of objects. In the present disclosure, the machine learning model may be referred to as a model. The real world data may be referred to as real data. Finally, the simulated data may be referred to as virtual data.

During training, the machine learning model receives the simulated data, detects a simulated object, and predicts the simulated object's 9D pose (e.g., translation, volume, and rotation). Each object's predicted 9D pose may be identified with a 3D bounding box. A prediction error may be calculated from a loss between the predicted 3D bounding box and a 3D ground truth bounding box. The 3D ground truth bounding box refers to a known 3D bounding box that is generated as part of the simulation. The prediction error (e.g., loss) may be backpropagated to update parameters of the model. That is, parameters of the model are adjusted to minimize the prediction error.

To improve an accuracy of a model, it is desirable to use real world data, such as real world images of objects, during training. In conventional systems, objects in real world images may be annotated with 3D bounding boxes by a human annotator to generate 3D ground truth bounding boxes. Given a limited time to annotate images, the 3D ground truth bounding boxes annotated (e.g., labeled) by the human annotator may be inaccurate. Inaccurate 3D ground truth bounding boxes may lead to training errors, which may lead to errors in the final model. Furthermore, due to the intricacies of accurately determining an object's volume and rotation, an amount of training time is increased when 3D ground truth bounding boxes are provided by the human annotator.

To improve the accuracy and speed of training, objects in real world images may be annotated with 2D bounding boxes by the human annotator to generate 2D ground truth bounding boxes. Still, conventional 3D object detection models are not trained using 2D ground truth bounding boxes because conventional 3D object detection models cannot determine a prediction error between a predicted 3D bounding box and a 2D ground truth bounding box. That is, a 3D prediction error cannot be calculated when the real world image does not include a 3D ground truth bounding box. Additionally, a 2D prediction error cannot be calculated when the predicted 3D bounding box cannot be compared to the 2D ground truth bounding box.

As discussed herein, 3D ground truth bounding boxes are used to train a model for 3D object detection. The 3D ground truth bounding boxes may be generated by annotating (e.g., labeling) objects in each frame of a sequence of frame. Due to the vast amount of data used for training, the process of annotating objects in each each frame may be time intensive. Furthermore, the use of human annotators is expensive and prone to errors.

To reduce the time, costs, and errors associated with using annotated real world data to train the model, simulated data may be used as an alternative to the real world data. In the simulated data, the data and labels are machine generated. However, when the model is trained with only simulated data, the resulting model may be an overfitted model. An overfitted model generally refers to a model that has been trained too well, such that the performance of the model is reduced when the model is presented with new data, such as real world data. The models trained with only simulated data may not be suitable for real world scenarios.

There is a need to train a model with both simulated data and real world data. For example, the simulated data may be used to train the model to determine the 3D position, size, and orientation of an object. The real world data may be used to train the model to recognize patterns in real world images. Additionally, the real world data may prevent overfitting based on the simulated data. Performance of the trained model may be improved when the model is trained with the simulated data and the real world data.

According to aspects of the present disclosure, the model is trained in an iterative manner using simulated (e.g., synthetic) data associated with machine generated 3D bounding boxes and real world data associated with human annotated 2D bounding boxes. In one configuration, during the simulated data iteration, a 3D prediction error is used to update the model. Additionally, during the real world data iteration, the model generates a 3D response to a 2D image. For example, the 3D response may be a 3D bounding box. The 3D response is transformed to a 2D response that is compatible with the provided 2D annotation. For the real world data, the model is updated with a 2D prediction error.

To train the model with both the simulated data and real world data, aspects of the present disclosure are directed to using a translator function. The translator function may bridge a domain gap between the model's predictions and the annotated real world data. In one configuration, the translator function transforms parameters of a predicted 3D bounding box to a 2D bounding box that is comparable with a 2D ground truth bounding box.

FIG. 1 illustrates an example of training a model using simulated data according to aspects of the present disclosure. As shown in FIG. 1, during training, at block 100, the model may receive a simulated data frame 108 that includes a simulated image of a road 102 and a car 104. Simulated data refers to virtual data generated by a device, such as a computer. The simulated data may be photo-realistic.

At block 105, based on initial training parameters (e.g., weights and biases), the model detects one or more objects in the simulated data frame 108. The model may be trained to detect one or more specific types of objects or areas of interest, such as cars, pedestrians, buildings, and bikes. Alternatively, the model may be trained to detect all objects (e.g., 3D objects). Each detected object may be localized with a 3D bounding box 112. For example, the model may detect the car 104 in the simulated data frame 108. In this example, the translation, volume, and rotation of the 3D bounding box 112 are based on a predicted (e.g., estimated) 9D pose of a corresponding object (e.g., car 104).

At block 110, the 3D bounding box 112 is compared with a 3D ground truth bounding box 114. In one configuration, the 3D ground truth bounding box 114 is generated as part of the simulation data. Because the car 104 is a simulated object, the simulation data includes data corresponding to the car's 104 3D pose. Thus, as shown in block 110, the 3D ground truth bounding box 114 has a better fit around the car 104 in comparison to a fit of the 3D bounding box 112.

In the present example, the model may have overestimated the car's 104 3D pose (as illustrated in the 3D bounding box 112). A difference between coordinates of the 3D bounding box 112 and the 3D ground truth bounding box 114 may be used to determine a prediction error. As an example, one of the differences may be a difference 116 between two similar coordinates, such as the upper right (x, y, z) coordinates, of the 3D bounding box 112 and the 3D ground truth bounding box 114. Parameters of the model may be updated to reduce subsequent prediction errors.

The difference 116 between the two coordinates shown in FIG. 1 is used as an example. Aspects of the present disclosure are not limited to only calculating a difference between two points of the 3D bounding box 112 and the 3D ground truth bounding box 114. Furthermore, aspects of the present disclosure are not limited to detecting one object in a frame. Multiple objects may be detected in each frame.

To improve training, the model should also be trained on real world images of objects, such that the model is trained on both real world images of objects and simulated images of objects. In conventional systems, a human annotates a real world image of an object with a 3D bounding box. That is, a human draws the 3D bounding box around the real world image of the object to generate the 3D ground truth bounding box. The 3D ground truth bounding box is intended for comparison with a predicted 3D bounding box to determine a prediction error.

As previously discussed, human annotated 3D ground truth bounding boxes are prone to error as a human may not be as precise as a machine (e.g., computer) that generates 3D ground truth bounding boxes based on 3D pose information provided in simulated images of objects. Errors in the human annotated 3D ground truth bounding boxes may be propagated through the model, leading to inaccuracies in the final trained model. Furthermore, a process for a human to annotate real world images with 3D ground truth bounding boxes is time consuming.

In some cases, a human may annotate real world images of objects with 2D ground truth bounding boxes. That is, a human may draw the 2D ground truth bounding box around an object. The human annotated 2D ground truth bounding box may be more accurate in comparison to the human annotated 3D ground truth bounding box. Thus, the accuracy of the model may be improved by using human annotated 2D ground truth bounding boxes. Furthermore, a time period for drawing the 2D ground truth bounding box around the object is less than a time period for drawing the 3D ground truth bounding box around the object. Therefore, the training time may be decreased by using human annotated 2D ground truth bounding boxes Still, conventional models do not use 2D ground truth bounding boxes because a predicted 3D bounding box cannot be compared to a 2D ground truth bounding box to calculate a prediction error. For example, a 3D bounding box includes twenty-four coordinates (e.g., (x, y, z) coordinates for each corner). A 2D bounding box includes eight coordinates (e.g., (x, y) coordinates for each corner). As such, the model cannot determine a prediction error due to the different number of coordinates for the predicted 3D bounding box and the 2D ground truth bounding box.

Figure 2:
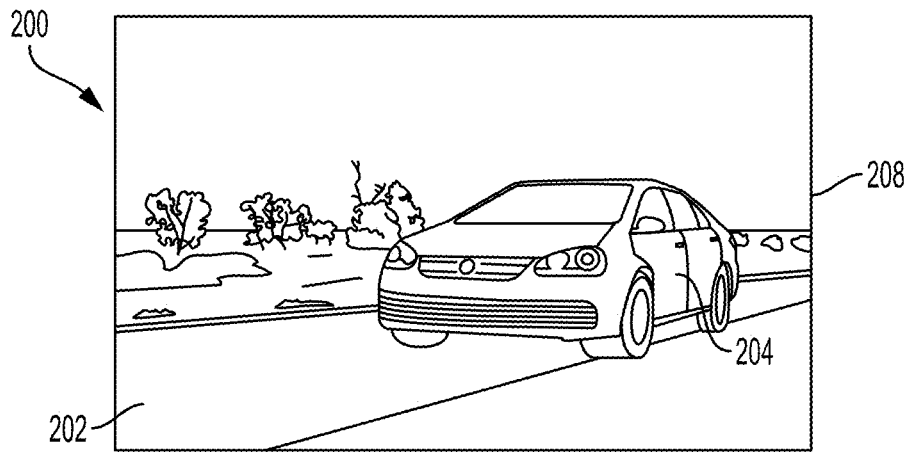
FIG. 2 illustrates an example of training a model using real data.
Figure 2:
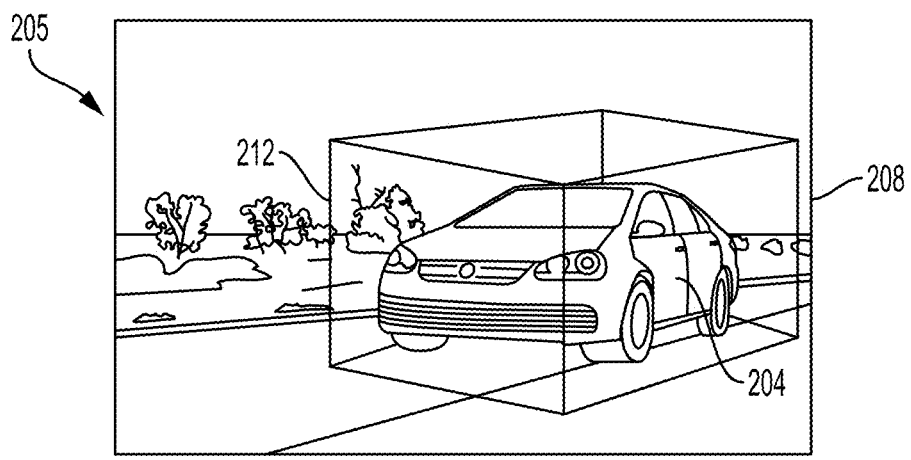
Figure 2:
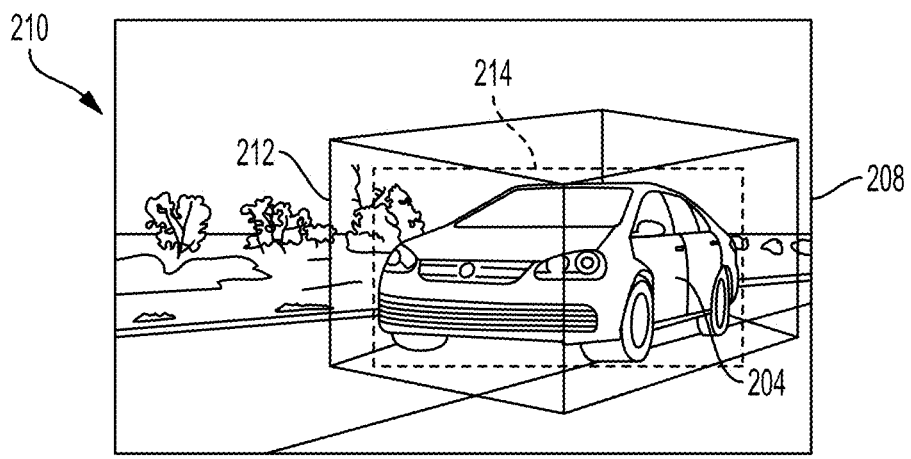

FIG. 2 illustrates an example of detecting an object in a real world image. As shown in FIG. 2, during training, at block 200, the model receives a real world data frame 208 that includes a real world image of a road 202 and a car 204.

Real world data refers to an image captured by an image capturing device, such as an RGB camera, in a real environment.

At block 205, based on initial parameters, the model detects one or more objects in the real world data frame 208. Each detected object may be localized with a 3D bounding box 212 based on the predicted 9D pose of each corresponding object. For example, the model may detect the car 204 in the real world data frame 208. In this example, a 3D bounding box 212 is drawn around the predicted 9D pose of the car 204.

At block 210, the 3D bounding box 212 is compared with a 2D ground truth bounding box 214. As previously discussed, the 2D ground truth bounding box 214 may be drawn by a human annotator. In the present example, the model has overestimated one or more attributes corresponding to the car's 204 9D pose. That is, the height, length, and width of the 3D bounding box 212 are greater than the height, length, and width of the car 204.

To improve the accuracy of object detection applications, such as a robotic device's interactions with real world objects, a predicted bounding box should be substantially similar to a ground truth bounding box of the detected object. In this example, the 3D bounding box 212 generated based on predicted attributes of the car 204 should be substantially similar to the 9D pose of the car 204. To improve the model's accuracy, the model's parameters may be updated to reduce a prediction error.

Still, in this example, the model cannot determine a difference between coordinates of the 3D bounding box 212 and the 2D ground truth bounding box 214. That is, because the number of coordinates differs between the 3D bounding box 212 and the 2D ground truth bounding box 214, the prediction error is not determined. Thus, as shown in the current example, conventional systems may not determine a 3D prediction error by using a 2D ground truth bounding box 214 in a real world image of an object.

According to aspects of the present disclosure, the model generates a 3D bounding box for objects in an image. The 3D bounding box may be generated based on a function F( ). The function F( ) may be represented as:

$$F(x)=y, \tag{1}$$

where x is a training image, such as a real world image or a simulated image, and y is a predicted 3D bounding box. Aspects of the present disclosure are directed to error minimization for a model. The error function E( ) of the model is as follows:

$$E(x,y^*)=\|F(x)-y^*\|. \tag{2}$$

That is, for a training image x and a ground truth bounding box y*, the error function minimizes an error between the predicted 3D bounding box y and the ground truth bounding box y*. The error is not limited to a specific loss, such as L1 loss or L2 loss. In one configuration, the error is the difference in dimensions between the predicted 3D bounding box y and the ground truth bounding box y*. For example, a distance between corresponding corner points of the predicted 3D bounding box y and the ground truth bounding box y* may be used to determine the difference in dimensions.

When the ground truth bounding box y* is a 3D bounding box, the error may be minimized based on EQUATION 2. However, due to the difference in dimensions between the predicted 3D bounding box y and a 2D ground truth bounding box y*, the model cannot calculate the difference in dimensions between the predicted 3D bounding box y and the ground truth bounding box y*. Therefore, the model may not be updated to minimize the error between the predicted 3D bounding box y and a 2D ground truth bounding box y*.

To minimize the error between the 3D bounding box y and the 2D ground truth bounding box y*, the 3D bounding box y may be transformed into a 2D bounding box. In one configuration, a transformation function G() is used to transform the 3D bounding box y generated by F(x) to a format that is compatible with a 2D ground truth bounding box y*. When a transformation is necessitated to transform a predicted annotation (e.g., label) to a format that is compatible with a ground truth annotation, the error function $E_T$( ) is as follows:

$$E_T(x,y^*)=\|G(F(x))-y^*\|. \tag{3}$$

Figure 3:
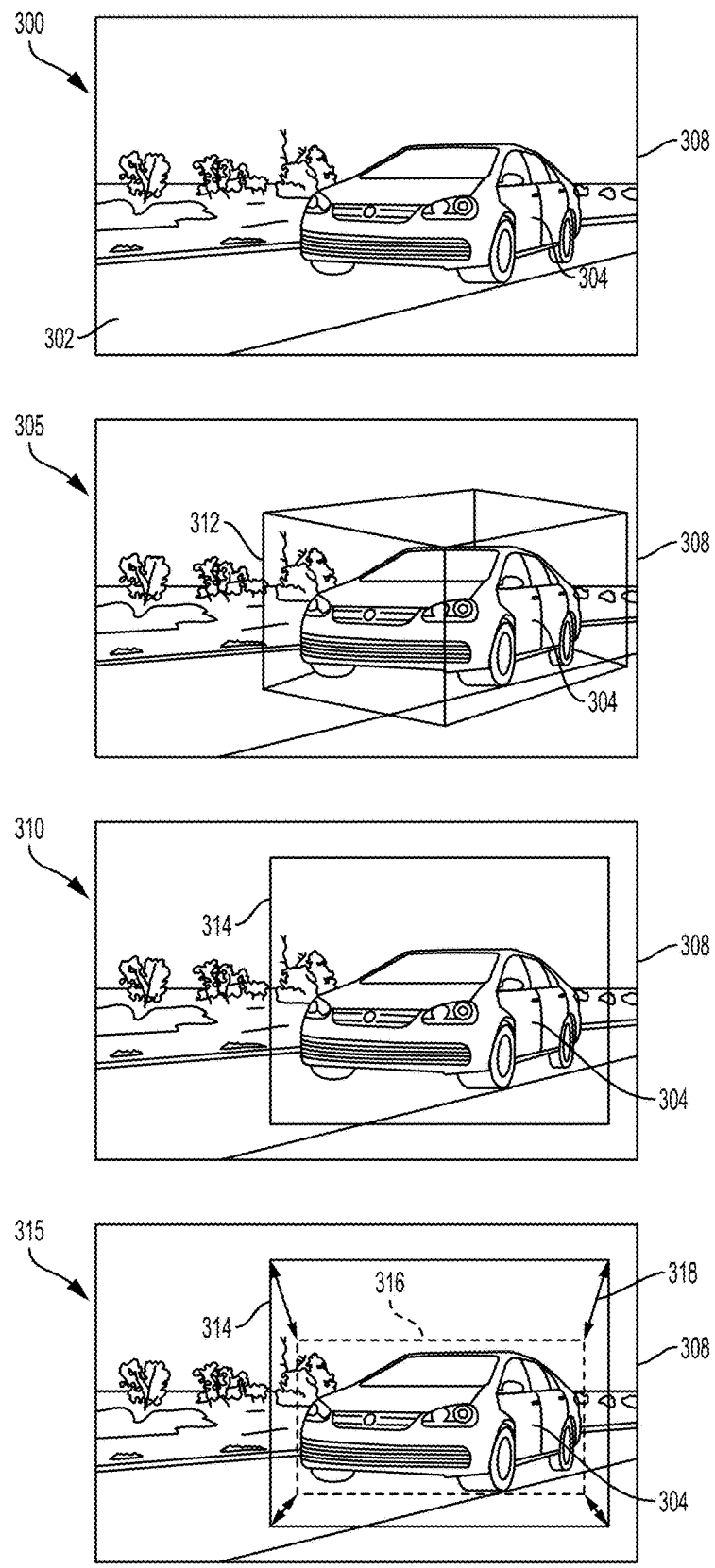
FIG. 3 illustrates an example of a transformation of a 3D bounding box to a 2D bounding box according to aspects of the present disclosure.

FIG. 3 illustrates an example of a transformation of a 3D bounding box to a 2D bounding box according to aspects of the present disclosure. As shown in FIG. 3, during training, at block 300, the model receives a real world data frame 308 that includes a real world image of a road 302 and a car 304. At block 305, based on initial training, the model detects one or more objects in the real world data frame 308. For example, the model may detect the car 304 in the real world data frame 308.

Each detected object may be localized with a 3D bounding box 312. In this example, the 3D bounding box 312 is determined based on the predicted 9D pose of the car 304. Furthermore, the model may have prior knowledge that the real world data frame 308 is annotated with a 2D ground truth bounding box 316. Therefore, as shown in block 310, a transform function is used to transform the 3D bounding box 312 to a 2D bounding box 314. In one configuration, when using a transform function, the 3D bounding box 312 is not drawn around an object, rather, the dimensions are used by the transform function to transform the 2D bounding box 314. The 3D bounding box 312 of FIG. 3 is provided for illustrative purposes.

At block 315, the 2D bounding box 314 is compared with a 2D ground truth bounding box 316. Because the 2D bounding box 314 and the 2D ground truth bounding box 316 have similar dimensions, coordinates of the 2D bounding box 314 may be compared with coordinates of the 2D ground truth bounding box 316. The error function for the model minimizes the difference 318 between the 2D bounding box 314 and the 2D ground truth bounding box 316. That is, parameters of the model may be updated to minimize the aforementioned error.

In one configuration, the transformation function transforms a 3D bounding box to a 2D bounding box. In this configuration, the transformation function G() is as follows:

$$G() = T + \begin{pmatrix} x \\ y \\ z \end{pmatrix} R \cdot \begin{pmatrix} f_x & 0 & c_x \\ 0 & f_y & c_y \\ 0 & 0 & 1 \end{pmatrix} = \begin{pmatrix} x' \\ y' \\ z' \end{pmatrix} = \begin{pmatrix} x'/z' \\ y'/z' \\ 1 \end{pmatrix} z' \tag{4}$$

In EQUATION 4, a 2D corner point (x', y') of a 2D bounding box is calculated from each corner point (x, y, z) of the 3D bounding box. In one configuration, T is a 3×1 translation vector, R is a 3×3 rotation matrix, $$\begin{pmatrix} x \\ y \\ z \end{pmatrix}$$

are coordinates to one corner point of the 3D bounding box, and $$\begin{pmatrix} f_x & 0 & c_x \\ 0 & f_y & c_y \\ 0 & 0 & 1 \end{pmatrix}$$

is the camera projection matrix. For the camera projection matrix, $f_x$ and $f_y$ are the focal length for either image axis, and $c_x$ and $c_y$ represent the principal point of the image. The values for the camera projection matrix are intrinsic to the 2D sensor. The values for T, R, and $$\begin{pmatrix} x \\ y \\ z \end{pmatrix}$$

may be obtained from the 3D bounding box (e.g., F(x)). The transformation function calculates (x'/z', y'/z') coordinates of a 2D bounding box from each corner point (x, y, z) coordinate of the 3D bounding box. After transforming all (x, y, z) coordinates of the 3D bounding box, the transform function performs a min and a max operation on all eight transformed points to obtain the final four points of the 2D bounding box.

The transform function is not limited to transforming a 3D bounding box to a 2D bounding box. According to aspects of the present disclosure, the transform function may be used for other types of perception discrepancies. For example, a model may be trained to generate a parametric representation of a road. The representation may be a spline, a polynomial, or another type of parametric representation. For example, given multiple control points, the model may determine the spline of the road. In this example, the parametric representation determines a curve of the road.

When training the model with simulated data, the model may determine a parametric representation of a simulated road for a given simulated data frame. The device that generated the simulated data may also calculate a ground truth parametric representation of the simulated road. For example, the model may predict a spline of the road and the predicted spline may be compared to a ground truth spline to determine a prediction error. An error function, such as the error function of EQUATION 2, may be used to minimize the prediction error between the predicted spline and the ground truth spline.

Figure 4A:
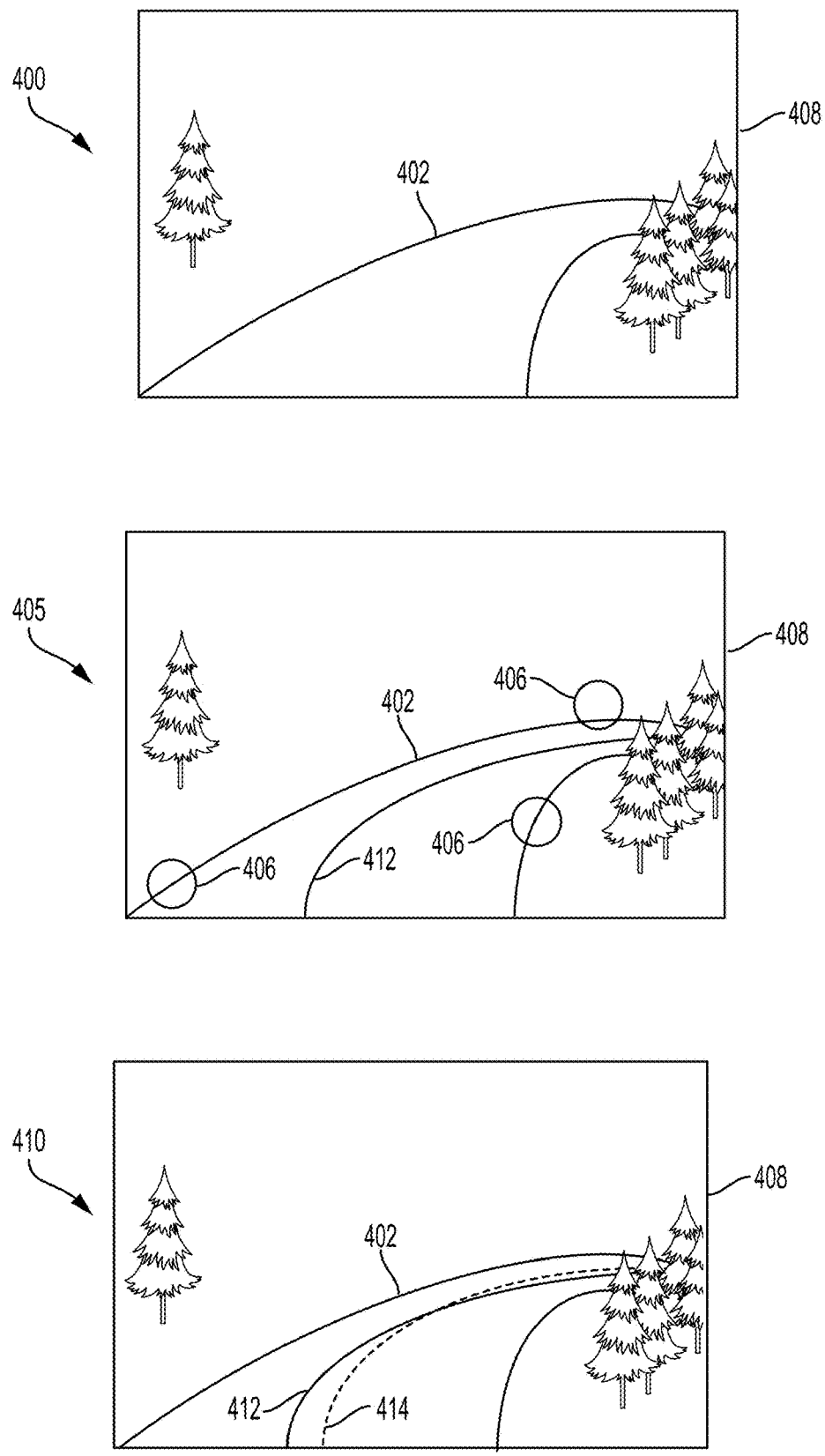
FIGS. 4A and 4B illustrate an example of determining a parametric representation for an element in a simulated data frame according to aspects of the present disclosure.

FIG. 4A illustrates an example of determining a parametric representation for an element in a simulated data frame 408 according to aspects of the present disclosure. As shown in FIG. 4A, during training, at block 400, the model receives a simulated data frame 408 that includes a simulated image of a road 402. At block 405, based on initial training, the model determines a parametric parameter for one or more elements in the simulated data frame 408.

For example, the model may be trained to determine the parametric parameter of the road 402. Of course, aspects of the present disclosure are not limited to determining the parametric parameter of the road 402. The model may determine the parametric parameter of other elements in a frame. As shown in FIG. 4A, the model identifies multiple points 406 on the road 402 to predict a spline 412. The predicted spline 412 represents a predicted curve of the road 402.

At block 410, the predicted spline 412 is compared with a ground truth spline 414. In one configuration, the ground truth spline 414 is generated as part of the simulation data. Because the road 402 is a simulated object, the simulation data provides accurate data of the road's 402 parametric representation to generate the ground truth spline 414. Thus, as shown in FIG. 4A, the ground truth spline 414 is a more accurate representation of the road's 402 curve in comparison to the predicted spline 412.

In the present example, a difference between coordinates of the predicted spline 412 and the ground truth spline 414 may be used to determine a prediction error. An error function, such as the error function of EQUATION 2, may be based on the minimized difference between coordinates of the predicted spline 412 and the ground truth spline 414. In this example, for EQUATION 2, x is the simulated data frame 408, y is the predicted spline 412 (e.g., the output of the function F(x)), and y* is the ground truth spline 414.

The simulated data may include information used to generate an accurate ground truth parametric representation. Additionally, or alternatively, the simulated data may include information that identifies specific pixels that correspond to each element in a frame. For example, for simulated data that includes a road, the simulated data may identify specific pixels that correspond to the road and other specific pixels that correspond to other elements, such as trees.

Figure 4B:
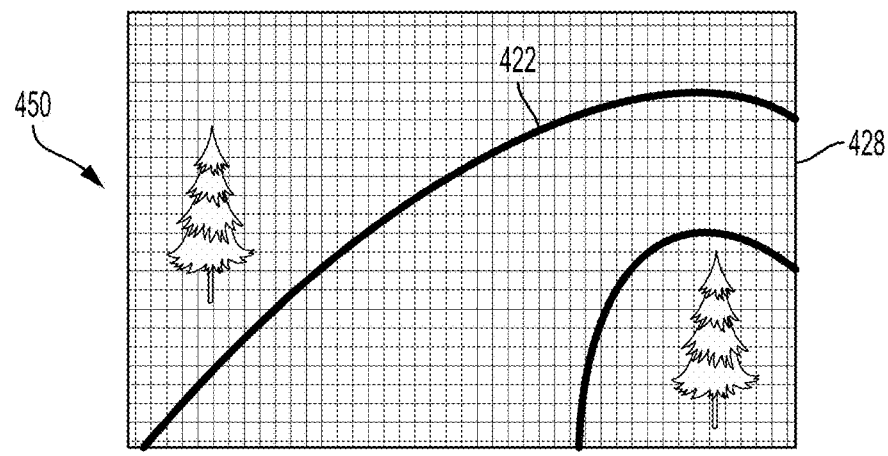
Figure 4B:
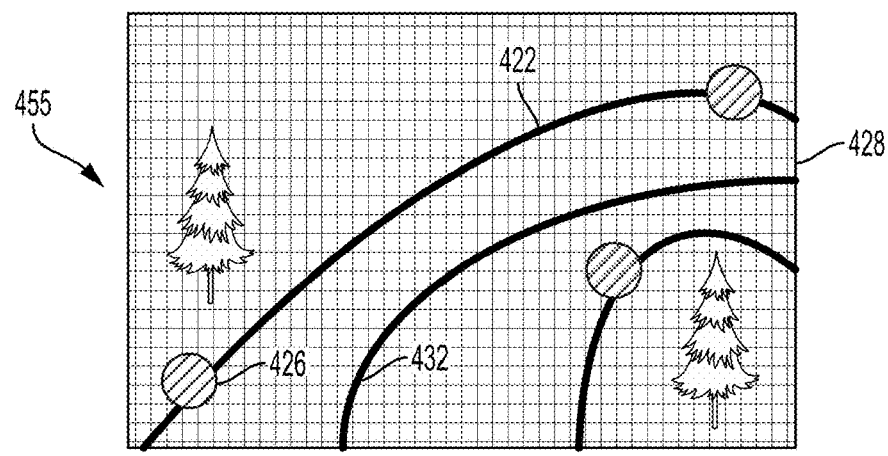
Figure 4B:
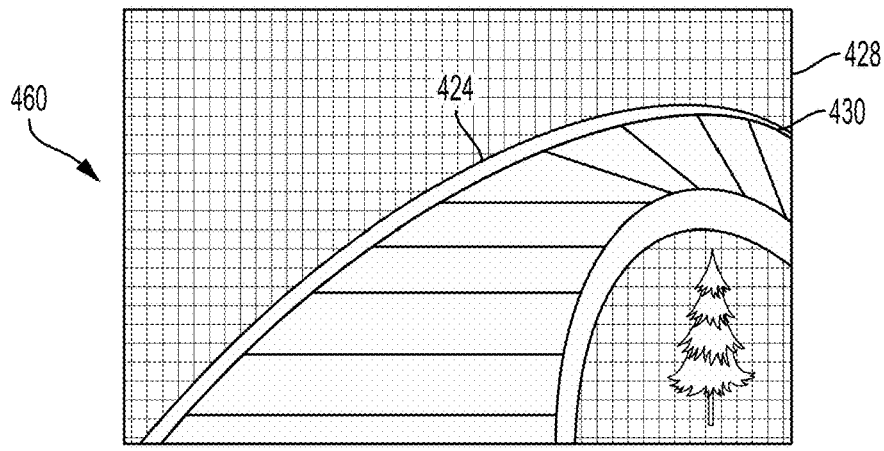

FIG. 4B illustrates an example of determining a parametric representation for an element in a simulated data frame 428 according to aspects of the present disclosure. As shown in FIG. 4B, during training, at block 450, the model receives a simulated data frame 428 that includes a simulated image of a road 422. At block 455, based on initial training, the model determines a parametric parameter for one or more elements in the simulated data frame 428.

For example, the model may be trained to determine the parametric parameter of the road 422. Of course, aspects of the present disclosure are not limited to determining the parametric parameter of the road 422. The model may determine the parametric parameter of other elements in a frame. As shown in FIG. 4B, the model identifies multiple points 426 on the road 422 to predict a spline 432. The predicted spline 432 represents a predicted curve of the road 422.

In the present example, the simulated data does not include a ground truth spline. Rather, the simulated data has distinguished pixels corresponding to the road 422 from other pixels in the frame 428. Therefore, the format of the predicted spline 432 does not match a format of the ground truth representation 424 of the road 422. Thus, the predicted spline 432 is transformed to a format that corresponds to the format of the ground truth representation 424 of the road 422. In this example, the predicted spline 432 is transformed to a transformed spline 430. The transformed spline 430 is for illustrative purposes and is not meant to limit aspects of the present disclosure to the format shown in FIG. 4B.

At block 460, the transformed spline 430 is compared with the ground truth representation 424 of the road 422. In the present example, a difference between coordinates of the transformed spline 430 and the ground truth representation 424 of the road 422 may be used to determine a prediction error. An error function, such as the error function of EQUATION 3, may be based on the minimized difference between coordinates of the transformed spline 430 and the ground truth representation 424 of the road 422. In this example, for EQUATION 3, x is the simulated data frame 428, y is the predicted spline 432 (e.g., the output of the function F(x)), and y* is the ground truth representation 424 of the road 422. Additionally, the function GO transforms the predicted spline 432 to the transformed spline 430.

For real world data, a ground truth parametric representation is provided by a human annotator. Real world data does not include information for a human annotator to provide an accurate ground truth parametric representation. Still, the human annotator may generate substantially accurate ground truth parametric representations by performing various calculations using the real world data. Nonetheless, the amount of time needed to generate substantially accurate ground truth parametric representations by the human annotator may cause an increase in training time. To reduce training time, the human annotator may be given a limited time to annotate real world data with ground truth parametric representations.

Given the limited time to annotate real world data, the ground truth parametric representations provided by the human annotator may be inaccurate. However, given the limited time, the human annotator may be able to accurately identify various features in the real world data. In one configuration, the human annotator distinguishes pixels corresponding to one element from pixels corresponding to other elements in the real world data. For example, when determining a ground truth parametric representation of a road, the human annotator identifies pixels corresponding to the road.

Figure 5:
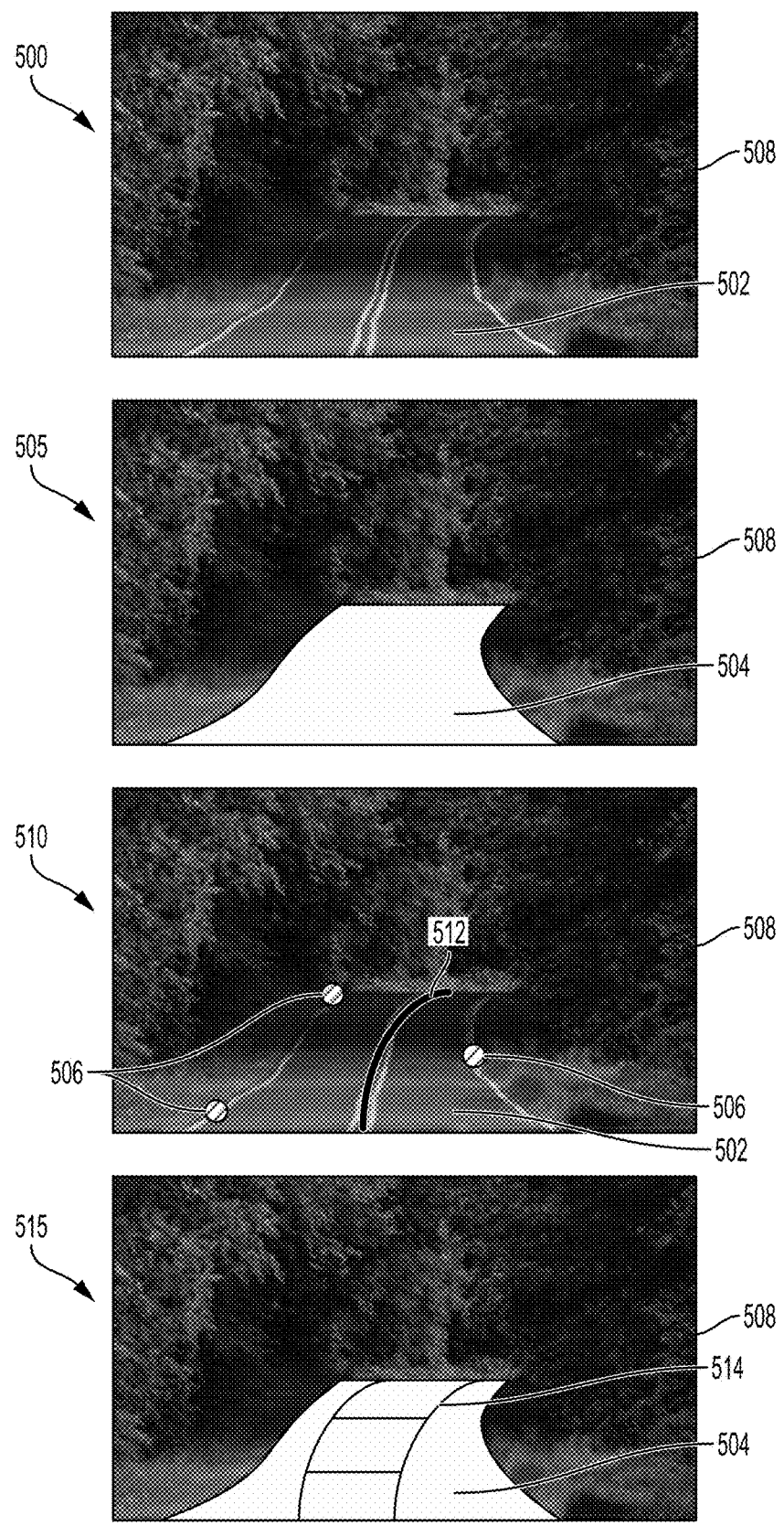
FIG. 5 illustrates an example of determining a parametric representation for an element in a real world data frame according to aspects of the present disclosure.

FIG. 5 illustrates an example of determining a parametric representation for an element in a real world data frame 508 according to aspects of the present disclosure. As shown in FIG. 5, during training, at block 500, the model receives the real world data frame 508 that includes a real world image of a road 502. The real world data frame 508 may comprise multiple pixels. Each pixel may be a cell in a grid of cells.

At block 505, based on a given task, such as annotating the road 502, a human annotator distinguishes pixels of the road 502 from other pixels in the real world data frame 508. For example, as shown in block 505, the human annotator highlights the pixels corresponding to the road 502. The highlighted pixels may be used as the ground truth representation 504 of the road 502.

At block 510, based on initial training parameters, the model identifies multiple points 506 on the road 502 to predict a spline 512. The predicted spline 512 represents a predicted curve of the road 502. In most cases, the predicted spline 512 is compared to a ground truth spline to determine a prediction error. (See FIG. 4A). However, in some cases, the ground truth spline is not available. For example, as previously discussed, when faced with a limited time, the human annotator may not provide accurate ground truth splines. Rather, as shown in block 505, the human annotator distinguishes pixels of the road 502 from pixels of other elements, such as trees and background.

To mitigate the difference between the predicted spline 512 and the distinguished pixels of the road 502, a translator function may be used to convert the predicted spline 512 to a format that can be compared against the ground truth representation 504 of the road 502. In one configuration, the transform function transforms the predicted spline 512 to a transformed spline 514 that is compared with the ground truth representation 504. The predicted error may be determined based on a comparison of the translated spline 514 and the ground truth representation 504.

At block 515, the transformed spline 514 is compared with a ground truth representation 504. In the present example, a difference between coordinates of the translated spline 514 and the ground truth representation 504 may be used to determine a prediction error. An error function, such as the error function of EQUATION 2, may minimize the difference between coordinates of the translated spline 514 and the ground truth representation 504. In this example, for EQUATION 3, x is the real world data frame 508, y is the translated spline 514 (e.g., the output of the function f(x)), and y* is the ground truth representation 504. Additionally, the function GO transforms the predicted spline 512 to the transformed spline 514.

Figure 6:
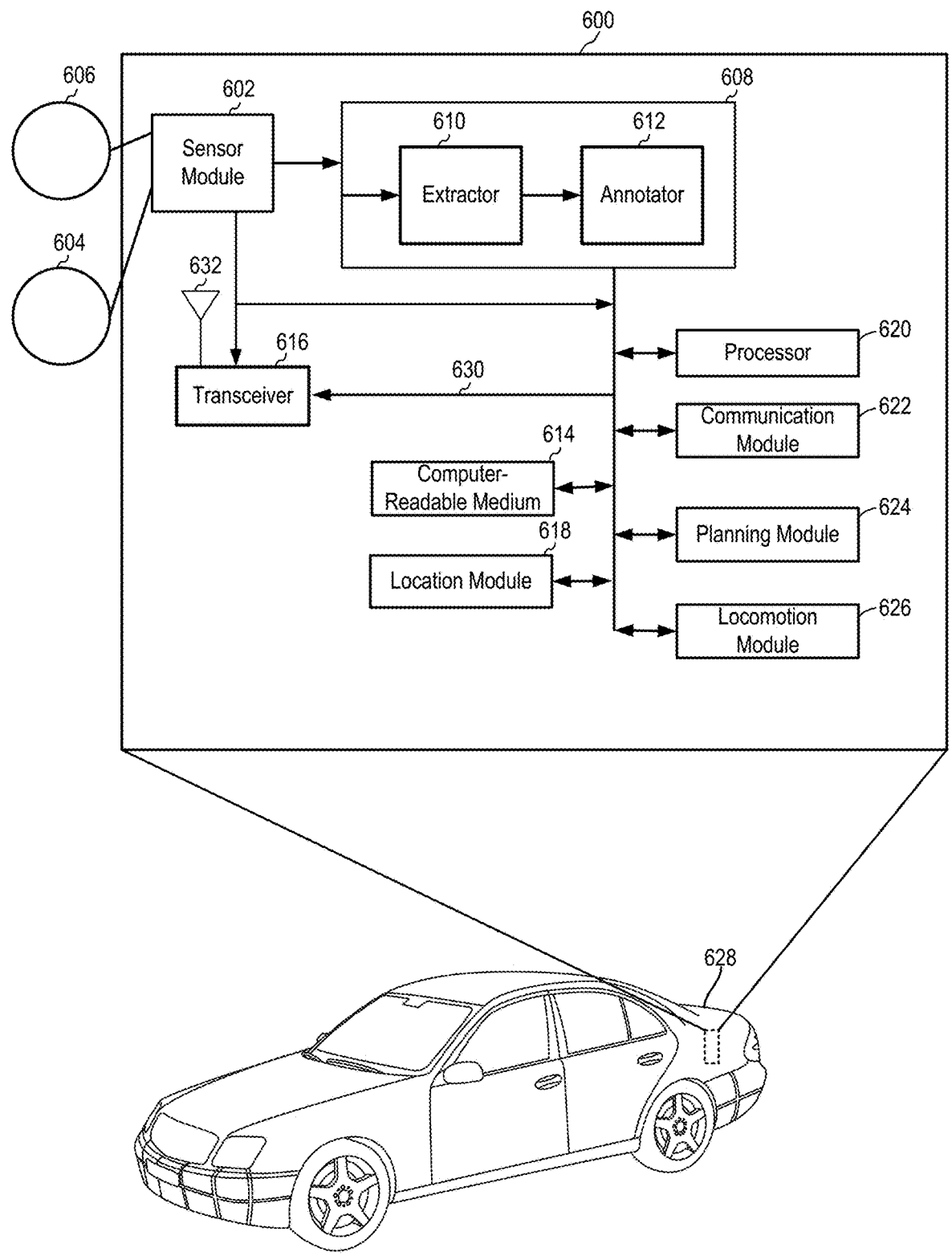
FIG. 6 is a diagram illustrating an example of a hardware implementation for an object localization system according to aspects of the present disclosure.

FIG. 6 is a diagram illustrating an example of a hardware implementation for an object localization system 600 according to aspects of the present disclosure. The object localization system 600 may be a component of a vehicle, a robotic device, or other device. For example, as shown in FIG. 6, the object localization system 600 is a component of a car 628. Of course, aspects of the present disclosure are not limited to the object localization system 600 being a component of the car 628, as other devices, such as a bus, boat, drone, or robot, are also contemplated for using the object localization system 600.

The object localization system 600 may be implemented with a bus architecture, represented generally by a bus 630. The bus 630 may include any number of interconnecting buses and bridges depending on the specific application of the object localization system 600 and the overall design constraints. The bus 630 links together various circuits including one or more processors and/or hardware modules, represented by a processor 620, a communication module 622, a location module 618, a sensor module 602, a locomotion module 626, a planning module 624, and a computer-readable medium 614. The bus 630 may also link various other circuits such as timing sources, peripherals, voltage regulators, and power management circuits, which are well known in the art, and therefore, will not be described any further.

The object localization system 600 includes a transceiver 616 coupled to the processor 620, the sensor module 602, an artificial neural network module 608, the communication module 622, the location module 618, the sensor module 602, the locomotion module 626, the planning module 624, and the computer-readable medium 614. The transceiver 616 is coupled to antennae 632. The transceiver 616 communicates with various other devices over a transmission medium. For example, the transceiver 616 may receive commands via transmissions from a user or a remote device. As another example, the transceiver 616 may transmit driving statistics and information from the artificial neural network module 608 to a server (not shown).

The object localization system 600 includes the processor 620 coupled to the computer-readable medium 614. The processor 620 performs processing, including the execution of software stored on the computer-readable medium 614 providing functionality according to the disclosure. The software, when executed by the processor 620, causes the object localization system 600 to perform the various functions described for a particular device, such as the car 628, or any of the modules 602, 608, 614, 616, 618, 620, 622, 624, 626. The computer-readable medium 614 may also be used for storing data that is manipulated by the processor 620 when executing the software.

The sensor module 602 may be used to obtain measurements via different sensors, such as a first sensor 606 and a second sensor 604. The first sensor 606 may be a vision sensor, such as a stereoscopic camera or an RGB camera, for capturing 2D images. The second sensor 604 may be ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 604, 606. The measurements of the first sensor 606 and the second sensor 604 may be processed by one or more of the processor 620, the sensor module 602, the artificial neural network module 608, the communication module 622, the location module 618, the locomotion module 626, the planning module 624, and the computer-readable medium 614.

As previously discussed, the measurements from the first sensor 606 may be used to capture 2D images. Furthermore, the measurements from the second sensor 604 may be used for depth measurements. In one configuration, the data captured by the first sensor 606 and the second sensor 604 may be transmitted to an external device via the transceiver 616. The first sensor 606 and the second sensor 604 may be coupled to the car 628 or may be in communication with the car 628.

The location module 618 may be used to determine a location of the car 628. For example, the location module 618 may use a global positioning system (GPS) to determine the location of the car 628. The communication module 622 may be used to facilitate communications via the transceiver 616. For example, the communication module 622 may be configured to provide communication capabilities via different wireless protocols, such as WiFi, long term evolution (LTE), 3G, etc. The communication module 622 may also be used to communicate with other components of the car 628 that are not modules of the object localization system 600.

The locomotion module 626 may be used to facilitate locomotion of the car 628. As an example, the locomotion module 626 may control movement of the wheels. As another example, the locomotion module 626 may be in communication with a power source of the car 628, such as an engine or batteries. Of course, aspects of the present disclosure are not limited to providing locomotion via wheels and are contemplated for any other type of component for providing locomotion, such as propellers, treads, fins, and/or jet engines.

The object localization system 600 also includes a planning module 624 for planning a route or controlling the locomotion of the car 628, via the locomotion module 626, based on the analysis performed by the artificial neural network 608. In one configuration, the planning module 624 overrides the user input when the user input is expected (e.g., predicted) to cause a collision. The modules may be software modules running in the processor 620, resident/stored in the computer-readable medium 614, one or more hardware modules coupled to the processor 620, or some combination thereof.

The artificial neural network 608 may be in communication with the sensor module 602, the transceiver 616, the processor 620, the communication module 622, the location module 618, the sensor module 602, the locomotion module 626, the planning module 624, and the computer-readable medium 614. In one configuration, the artificial neural network 608 receives sensor data from the sensor module 602. The sensor module 602 may receive the sensor data from the first sensor 606 and the second sensor 604. According to aspects of the disclosure, the sensor module 602 may filter the data to remove noise, encode the data, decode the data, merge the data, extract frames, or perform other functions. In an alternate configuration, the artificial neural network 608 may receive sensor data directly from the first sensor 606 and the second sensor 604.

As shown in FIG. 6, the artificial neural network 608 (e.g., machine learning module) may include an extractor 610 and an annotator 612. The extractor 610 and the annotator 612 may be components of a same or different convolutional neural network (CNN), such as a deep CNN. The artificial neural network 608 is not limited to a CNN and may be another type of artificial neural network, such as a support vector machine (SVM). The extractor 610 receives a data stream from the first sensor 606 and the second sensor 604. The data stream may be data combined from the first sensor 606 and the second sensor 604. For example, the data stream may be a 2D RGB image from the first sensor 606 that is merged with LIDAR data points from the second sensor 604. In another configuration, the data stream is a separate stream from each sensor 604, 606. The data stream may include multiple frames, such as image frames.

The extractor 610 extracts (e.g., identifies) areas of interest from each frame of the data stream. For example, the extractor 610 may be trained to extract features of 3D objects. As another example, the extractor 610 may be trained to extract features of different terrains, such as roads, sidewalks, buildings, and background. That is, the exactor 610 identifies areas of attention based on the training. The artificial neural network 608 may include one or more extractors 610. For example, one extractor 610 may be configured to detect 3D objects and another extractor 610 may be configured to segment different elements of the data, such as roads, sidewalks, buildings, and background.

The annotator 612 receives the extracted features from the extractor 610 to annotate the area of interest. The annotator 612 may be a classification segment of the CNN, as opposed to a human annotator as discussed herein before. As previously discussed, the annotator 612 may be configured to draw a 3D bounding box around an area of interest, such as an object. In another configuration, the annotator 612 determines a parametric representation of an area of interest, such as a road, or traffic lane. The artificial neural network 608 may output the annotated data from the annotator 612 to one or more of the sensor module 602, the transceiver 616, the processor 620, the communication module 622, the location module 618, the locomotion module 626, the planning module 624, and the computer-readable medium 614. For example, the annotated data may output to the planning module 624 for route planning, collision avoidance, or other planning functionality.

Figure 7:
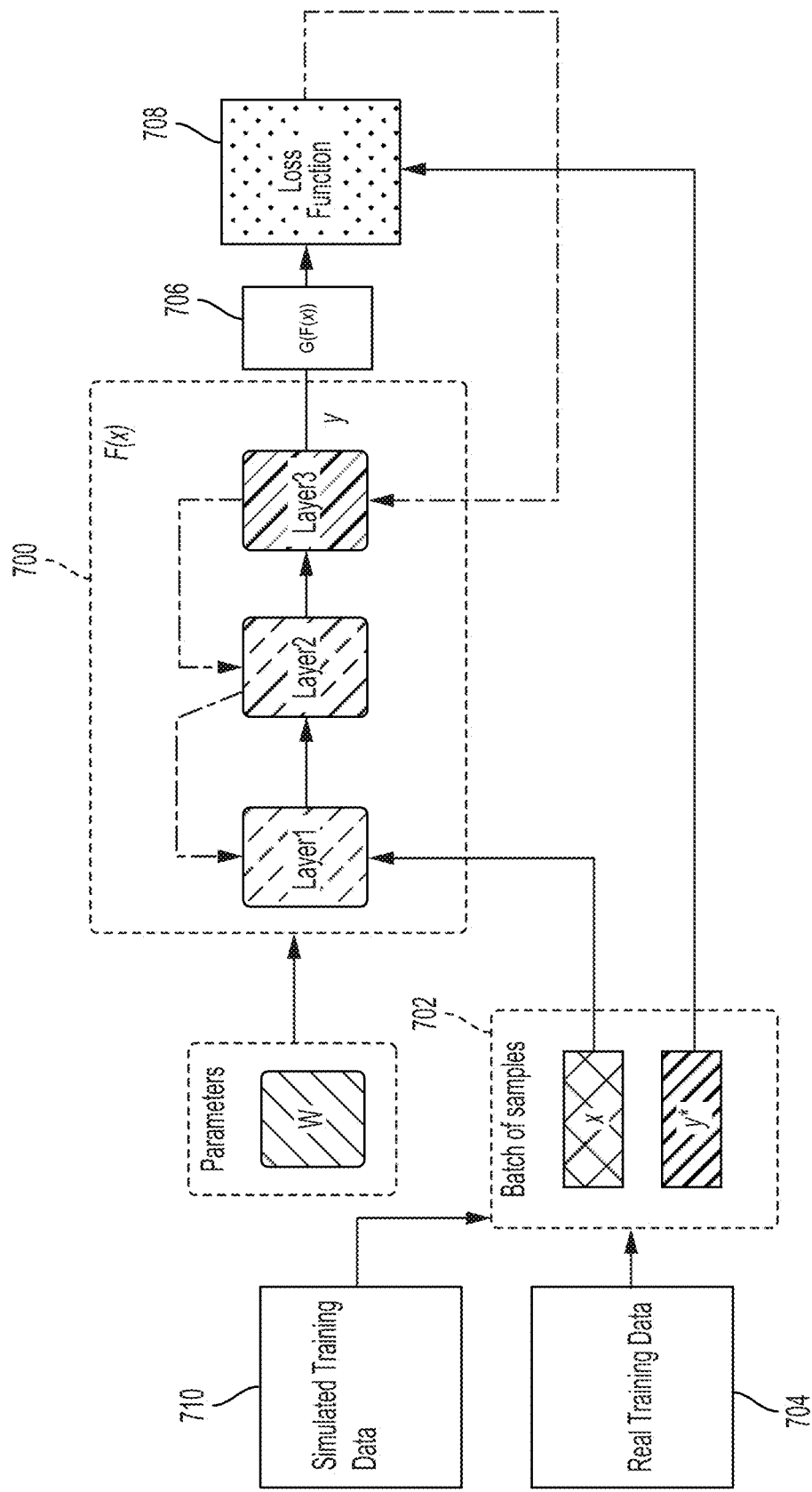
FIG. 7 illustrates a system flow diagram for training a machine learning model according to aspects of the present disclosure.

Aspects of the present disclosure are directed to improving the training of the model that includes an extractor and annotator. FIG. 7 illustrates a flow diagram for training a model 700 according to aspects of the present disclosure. In one configuration, training data 704, 710 may be stored at a data source, such as a server. As shown in FIG. 7, the real training data 704 may be distinguished from the simulated training data 710. The different training data 704, 710 may be stored on separate servers, distinguished via meta data, or some other type of distinction. During training, a set of samples 702 are selected from one of the sources of training data 704, 710. The set of samples 702 includes the input data x, such as the simulated data and the real world data. Additionally, the set of samples 702 includes ground truth labels y* corresponding to the input data x.

The model 700 may be initialized with a set of parameters w. The parameters may be used by layers of the model 700, such as layer 1, layer 2, and layer 3, of the model 700 to set weights and biases. The extractor and annotator of FIG. 6 may be different layers of the model 700. During training, the model 700 receives input data x to transform the input data x to an output y. As shown in EQUATION 1, the model 700 may be based on a function F( ). The output y may be parameters of an annotated element, such as a 3D bounding box or a parametric representation.

During training, if the source of a sample 702 was the real training data 704, the output y of the model 700 is input to a transform function 706 (G(F(x))). As discussed above, the transform function 706 may transform the output y to a format that corresponds to a format of the ground truth label y*. For example, if the ground truth label y* is a 2D bounding box, the transform function 706 transforms the 3D bounding box to a 2D bounding box. That is, the transform function 706 bridges a domain gap between the output y and ground truth labels that are in a different format from the output y. In some cases, such as when the ground truth label y* is in the same format as the output y, the transform function 706 is not used.

The output of the transform function 706 is received at a loss function 708. Depending on whether the output y was transformed, the output of the transform function 706 may be the transformed output y or non-transformed output y. The loss function 708 compares the transformed output y or non-transformed output y to the ground truth label y*. The error is the difference (e.g., loss) between the transformed output y or non-transformed output y and the ground truth label y*. The error is output from the loss function 708 to the model 700. The error is backpropagated through the model 700 to update the parameters. As shown in EQUATIONS 2 and 3, an error function E( ) and $E_T$( ) minimizes the error determined by the loss function 708. The training may be performed during an offline phase of the model.

Figure 8:
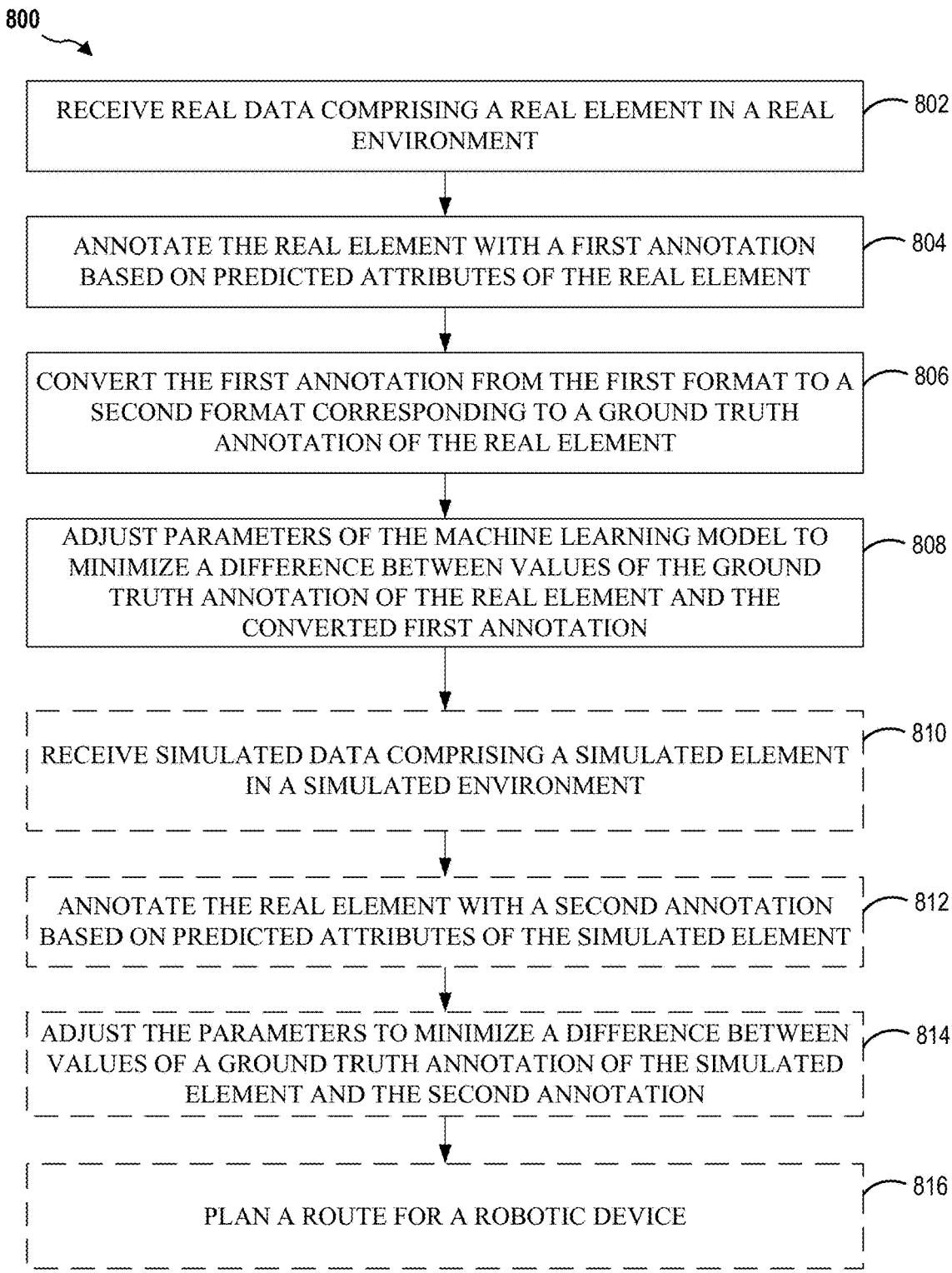
FIG. 8 illustrates a flow diagram for a method for training a machine learning model according to aspects of the present disclosure.

FIG. 8 illustrates a method 800 for training a machine learning model according to an aspect of the present disclosure. At block 802, the machine learning model receives real data comprising a real element in a real environment. The real data may include frames captured by a sensor, such as an RGB camera, LIDAR, RADAR, etc. At block 804, the machine learning model annotates the real element with a first annotation based on predicted attributes of the real element. The first annotation may be in a first format, such as a three-dimensional bounding box. For example, based on the predicted attributes, such as the dimensions of the real element, a three-dimensional bounding box may be placed around the real element. In another configuration, the first format is a parametric representation.

At block 806, the machine learning model converts the first annotation from the first format to a second format corresponding to a ground truth annotation of the real element. The second format may be a two-dimensional bounding box or distinguished pixels. For example, the three-dimensional bounding box may be converted to a two-dimensional bounding box. In another example, the parametric representation may be converted to distinguished pixels. At block 808, the machine learning model adjusts parameters of the machine learning model to minimize a difference between values of the ground truth annotation of the real element and the converted first annotation. In one configuration, the ground truth annotation of the real element is annotated by a human annotator.

In an optional configuration, at block 810, the machine learning model receives simulated data comprising a simulated element in a simulated environment. For example, the simulated data may be simulated by virtual environment that is generated by a computer. In another optional configuration, at block 812, the machine learning model annotates the real element with a second annotation based on predicted attributes of the simulated element. The second annotation may be in the first format. The second annotation may be annotated by the computer that generated the simulated data. For example, the second annotation may be a three-dimensional bounding box.

In still another optional configuration, at block 814, the machine learning model adjusts the parameters to minimize a difference between values of a ground truth annotation of the simulated element and the second annotation. The parameters may include weights of the machine learning model. After adjusting the parameters of the machine learning model (see blocks 808 and 814), in an optional configuration, at block 816, the adjusted machine learning model plans a route for a robotic device. The robotic device may be a vehicle, such as a drone or a car.

The various operations of methods described above may be performed by any suitable means capable of performing the corresponding functions. The means may include various specially configured hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a specially configured processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A specially configured processor may be a microprocessor, but in the alternative, the processor may be a commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. A method for training a machine learning model, comprising:
   receiving real data comprising a real element in a real environment;
   annotating the real element with a first annotation based on predicted attributes of the real element, the first annotation having a first format;
   determining a second format based on an existing format of a ground truth annotation of the real element, the first format and the second format representing different formats of a same annotation type;
   converting the first format of the first annotation to the determined second format; and
   adjusting parameters of the machine learning model to minimize a difference between values of the ground truth annotation of the real element and the converted first annotation.

2. The method of claim 1, further comprising:
   receiving simulated data comprising a simulated element in a simulated environment; and
   annotating the real element with a second annotation based on predicted attributes of the simulated element, the second annotation having the first format.

3. The method of claim 2, further comprising adjusting the parameters to minimize a difference between values of a ground truth annotation of the simulated element and the second annotation.

4. The method of claim 1, in which the first format is a three-dimensional bounding box and the second format is a two-dimensional bounding box.

5. The method of claim 1, in which the ground truth annotation of the real element is annotated by a human annotator.

6. The method of claim 1, further comprising planning a route for a robotic device via the adjusted machine learning model.

7. An apparatus for training a machine learning model, comprising:
   a memory, and
   at least one processor coupled to the memory, the at least one processor configured:
      to receive real data comprising a real element in a real environment;
      to annotate the real element with a first annotation based on predicted attributes of the real element, the first annotation having a first format;
      to determine a second format based on an existing format of a ground truth annotation of the real element, the first format and the second format representing different formats of a same annotation type;
      to convert the first format of the first annotation to the determined second format; and
      to adjust parameters of the machine learning model to minimize a difference between values of the ground truth annotation of the real element and the converted first annotation.

8. The apparatus of claim 7, in which the at least one processor is further configured:
   to receive simulated data comprising a simulated element in a simulated environment; and
   to annotate the real element with a second annotation based on predicted attributes of the simulated element, the second annotation having the first format.

9. The apparatus of claim 8, in which the at least one processor is further configured to adjust the parameters to minimize a difference between values of a ground truth annotation of the simulated element and the second annotation.

10. The apparatus of claim 7, in which the first format is a three-dimensional bounding box and the second format is a two-dimensional bounding box.

11. The apparatus of claim 7, in which the ground truth annotation of the real element is annotated by a human annotator.

12. The apparatus of claim 7, in which the at least one processor is further configured to plan a route for a robotic device via the adjusted machine learning model.

13. A non-transitory computer-readable medium having program code recorded thereon for training a machine learning model, the program code executed by a processor and comprising:
   program code to receive real data comprising a real element in a real environment;
   program code to annotate the real element with a first annotation based on predicted attributes of the real element, the first annotation having a first format;
   program code to determine a second format based on an existing format of a ground truth annotation of the real element, the first format and the second format representing different formats of a same annotation type;
   program code to convert the first format of the first annotation to the determined second format; and program code to adjust parameters of the machine learning model to minimize a difference between values of the ground truth annotation of the real element and the converted first annotation.

14. The non-transitory computer-readable medium of claim 13, in which the program code further comprises:
program code to receive simulated data comprising a simulated element in a simulated environment; and
program code to annotate the real element with a second annotation based on predicted attributes of the simulated element, the second annotation having the first format.

15. The non-transitory computer-readable medium of claim 14, in which the program code further comprises program code to adjust the parameters to minimize a difference between values of a ground truth annotation of the simulated element and the second annotation.

16. The non-transitory computer-readable medium of claim 13, in which the first format is a three-dimensional bounding box and the second format is a two-dimensional bounding box.

17. The non-transitory computer-readable medium of claim 13, in which the ground truth annotation of the real element is annotated by a human annotator.

\* \* \* \* \*